Figure 1:
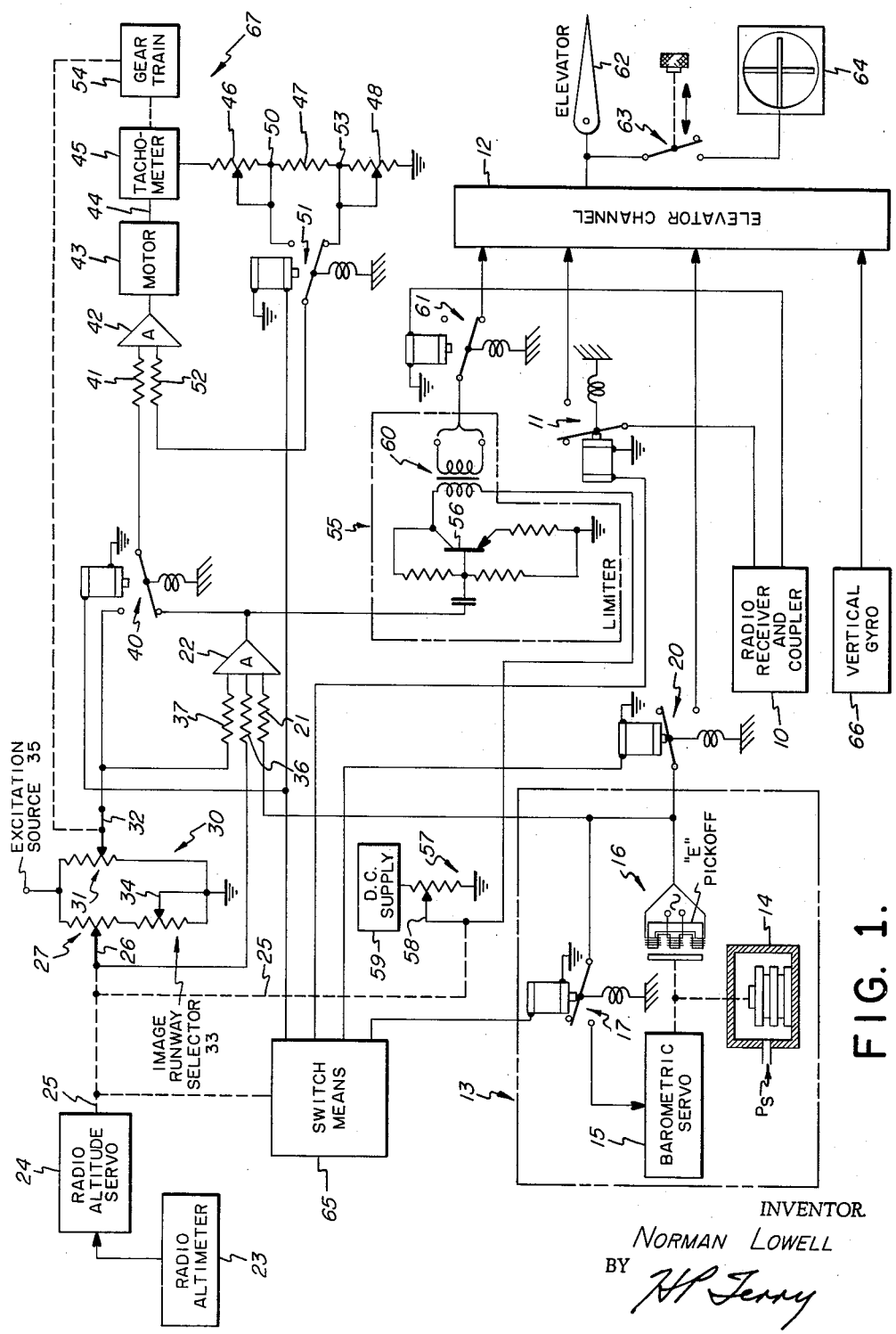

March 24, 1964    N. LOWELL    3,126,175
LANDING SYSTEM FOR AIRCRAFT
Filed Feb. 26, 1963    2 Sheets-Sheet 1

INVENTOR.
NORMAN LOWELL
BY
*H.P. Jerry*
ATTORNEY

United States Patent Office 3,126,175
Patented Mar. 24, 1964

3,126,175
LANDING SYSTEM FOR AIRCRAFT
Norman Lowell, Massapequa, N.Y., assignor to Sperry Rand Corporation, Great Neck, N.Y., a corporation of Delaware
Filed Feb. 26, 1963, Ser. No. 261,050
11 Claims. (Cl. 244—77)

The present invention relates to apparatus for guiding an aircraft to a landing.

The present invention may be utilized in an automatic flight control system to provide an automatic landing of the aircraft on the runway. The apparatus may also be utilized in a flight indicating system by means of which the pilot can guide the aircraft to a safe landing. The apparatus of the present invention provides path guidance during the final phase of an approach using an instrument landing system (ILS), for example. In instrument landing systems there is provided a radio beam glide path known as the glide slope which defines a descent path for the aircraft to follow in order to land on the runway. Conventional ILS apparatus provides a glide slope which is essentially a straight line intersecting the horizontal runway at an appreciable angle usually 2½ degrees. It has been found that this straight glide path brings the plane into contact with the earth with an excessive amount of shock. Therefore, it is desirable to asymptotically approach the runway in order that the flight path is flared out near the touchdown point. Also, at low altitudes the glide path beam is generally noisy and provides an erratic signal which is not suitable for guiding the aircraft to touchdown on the runway. Further, the glide path beam tends to bend near the earth's surface thereby rendering the glide path beam unsuitable for actually landing the aircraft. The present invention provides path guidance during the final phases of an ILS approach to touchdown on the runway.

The approach to the runway and the landing occur in rapid sequence beginning with the capture of the glide slope beam and terminating with a smooth landing on the runway. Between glide path capture and touchdown, the flight path is defined by three discrete functions known as glide path coupling, glide path extension, and flare. The primary means for control for each of the three aforementioned modes of operation is different. During glide path coupling, flight path control is maintained primarily by means of the radio glide slope beam. During glide path extension, barometric rate of descent is the primary control measure because the radio beam signals are unusable for the reasons given above. During flare, a modified radio altimeter signal provides the primary control. By means of the present invention the transition from one mode of operation to another is accomplished without transients thereby providing a smooth descent without abrupt undesired changes in the flight path at the low critical altitudes involved. Further, the present invention provides an exponential flare flight path with automatic recovery in the event the aircraft is caused to deviate from the predetermined flare flight path by external reasons such as wind effects.

The present invention is an improvement over the systems shown in U.S. Patent 2,841,345 entitled "Glide Path System of Flare Out" of Halpert et al., issued July 1, 1958 and U.S. Patent 3,052,427 entitled "Flare-Out System for Aircraft" of Match et al. issued September 4, 1962 and both assigned to the same assignee as the present invention.

It is therefore a primary object of the present invention to provide apparatus for guiding an aircraft along a glide path to an asymptotic landing.

It is a further object of the present invention to provide apparatus for guiding an aircraft smoothly along a glide path from one mode of operation to another to a safe landing.

It is an additional object of the present invention to provide an apparatus for guiding an aircraft to a landing including automatic recovery in the event the aircraft is deflected from the original flight path.

It is another object of the present invention to provide an automatic landing system for aircraft.

Figure 2:
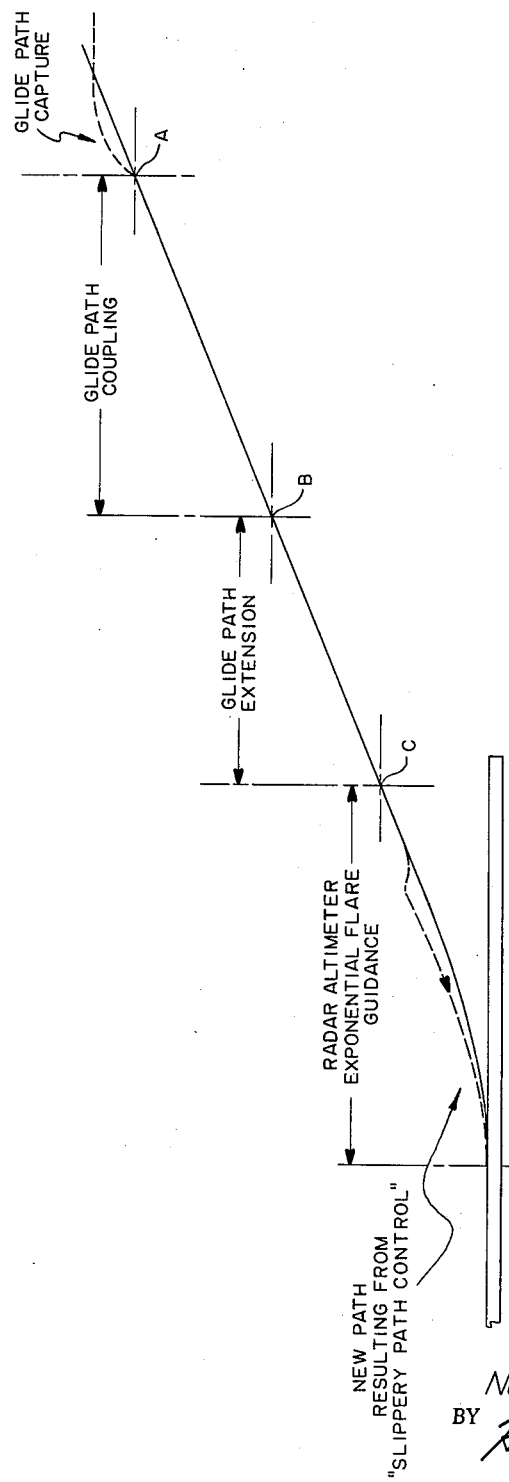

These and other objects of the present invention will become obvious by referring to the specification and drawings in which, FIG. 1 is a diagram of a typical glide path approach profile showing the successive modes of operation, and FIG. 2 is a schematic diagram of an embodiment of the present invention.

The present invention is not intended to be used in lieu of conventional ILS systems but rather is intended to be used in conjunction with them. A conventional ILS is shown in Mosely's Patent 2,423,337 issued July 1, 1947.

Referring to FIG. 1, a pictorial presentation of the approach profile illustrating the three successive modes of operation during the approach to the runway is shown. In a manner to be more fully described, the barometric rate of descent computer output is inserted into the system along with the flare computer output at the time of glide path capture. This technique provides an easy engage thereby preventing a severe transient from occurring at lower altitudes where the sensitivity is high and the control problem more critical. During glide path coupling, the barometric rate of descent computer and flare computer outputs remain at a null and therefore do not contribute to the autopilot pitch axis output.

During glide path extension, the glide path radio is disengaged and the aircraft is allowed to continue its descent to the runway at the same average rate it possessed while descending on the glide slope to this height. In this manner, the aircraft is allowed to descend to a favorable flare altitude along the same path established during the glide path phase. At flare altitude, the rate of descent reference is disconnected and flare path guidance substituted. This signal, derived from radar altitude enables the aircraft to complete its descent to the runway along an exponential path thereby effecting a smooth transition from glide path extension to touchdown.

Referring to FIG. 2, the apparatus of the present invention includes a radio beam receiver and coupler 10 which is responsive to the radio glide slope beam and provides a signal representative of the magnitude and direction of the deviation of the aircraft with respect to the center line of the radio beam. The radio receiver and coupler 10 is connected through a relay 11 to the elevator channel 12 of an automatic flight control system.

A barometric rate of descent computer 13 comprises a pressure responsive bellows 14 which is connected to a barometric servo 15 and the armature of an E pick-off 16. The barometric computer 13 may be of the type shown in U.S. Patent, 2,729,780 entitled "Altitude Control for Automatic Pilots," invented by Miller et al., issued January 3, 1956, and U.S. Patent 2,944,432, entitled "Pressure-Responsive Altitude Control Device," invented by Rintoul et al. and issued July 12, 1960, both of which are assigned to the same assignee as the present invention. The barometric computer 13 is responsive to the movement of the bellows 14 in accordance with atmospheric pressure and provides from the E pick-off 16 a signal representative of the rate of change of the pressure altitude or the barometric rate of descent, in a manner similar to the teaching of said U.S. Patent 3,052,427. The output terminal of the E pick-off 16 is connected in follow-up fashion through a relay 17 to an input terminal of the barometric servo 15 in order that with the relay 17 closed, the barometric computer 13 is maintained in a follow-up condition. The output terminal of the E pick-off 16 is further connected through a relay 20 to another input terminal of the elevator channel 12. The output terminal of the E pick-off 16 is also connected through a gain calibrating resistor 21 to an input terminal of an algebraic summing amplifier 22 for reasons to be explained.

A radio altimeter 23 provides a signal representative of the absolute instantaneous radio-defined altitude of the aircraft above the earth. The radio-altimeter 23 is connected to a radio altitude servo 24 which may be a conventional electromechanical motor generator set that provides a shaft position on its output shaft 25 representative of the radio-defined altitude of the aircraft. The shaft 25 is connected to position the wiper 26 of a potentiometer 27. The potentiometer 27 forms one portion of a bridge network 30. The bridge network 30 comprises the potentiometer 27, an opposing potentiometer 31 having wiper 32, and an image runway potentiometer 33 having a wiper connected to an extremity of the potentiometer 31 and to a common excitation source 35. The other extremity of the potentiometer 27 is connected to one extremity of the potentiometer 33 while the other extremity of the potentiometer 33 and the remaining extremity of the potentiometer 31 are connected together to ground potential. The bridge network 30 therefore provides a comparison beween the signal appearing on the potentiometers 27 and 33 with that appearing on the potentiometer 31. The purpose of the pridge network 30 is to synchronize the apparatus to the reference altitude during follow-up and provide a flight path reference source during the flare guidance mode in a manner to be explained. The wipers 26 and 32 are connected to respective gain calibration resistors 36 and 37 which in turn are connected to respective input terminals of the amplifier 22. The wiper 32 is also selectively connected through a relay 40 to a gain calibrating resistor 41 and thence to an input terminal of an algebraic summing amplifier 42.

The output of the amplifier 22 is selectively connected through the relay 40 to the resistor 41 and the amplifier 42. The output of the amplifier 42 is connected to energize a servo motor 43 which has its output shaft 44 connected to drive a tachometer generator 45 and the wiper 32 through a gear train 54. A plurality of tachometer attenuating resistors 46, 47 and 48 are serially connected between the tachometer generator and ground potential to form a voltage divider. The junction 50 between the resistors 46 and 47 is selectively connected through a relay 51 and a gain calibrating resistor 52 to another input terminal of amplifier 42. Alternatively, the junction 53 between the resistors 47 and 48 is connected through the relay 51 and resistor 52 to the amplifier 42. The resistors 46 and 47 may be adjustable in accordance with the aircraft characteristics and the desired flight characteristics. In the follow-up mode with the junction 53 connected to the amplifier 42, the feedback signal from the tachometer generator 45 provides a damping signal to the amplifier 42 and the linear potentiometer 31 is slaved to the output of the radio altimeter 23 by means of a high gain instrument servo loop 67 which functions as a flare computer. At the flare engage altitude, the input to the instrument servo 67 is switched so that it now acts as a velocity servo which is driven by the output of the linear potentiometer 31. Thereafter, an exponential command signal is generated by making the servo velocity proportional to the input command in a manner to be explained. The input is equal to aircraft height only at the time the flare mode is engaged. With the junction 50 connected to the amplifier 42, a larger tachometer signal is provided in order to balance the new input to the amplifier 42 from the potentiometer 31 corresponding to the flare altitude in order to maintain the velocity of the servo 67 at the same value which it had prior to switching.

The amplifier 22 is also connected to a variable limiting circuit 55. The variable limiting circuit may comprise a transistor 56 which has its collector biased by means of a potentiometer 57 which has its wiper 58 connected through a transformer 60 to the collector of the transistor 56. The potentiometer 57 is connected to a D.C. supply 59 in order that the bias on the limiting circuit 55 is varied as a function of the radio-defined altitude by positioning the wiper 58 in accordance with the movement of the shaft 25. The limiting circuit 55 is connected through a relay 61 to an input terminal of the elevator channel 12. The relay 61 is controlled by the radio receiver and coupler 10 in a manner to be explained. The elevator channel 12 is connected to control the elevator 62 of the aircraft or may be connected by means of a manual switch 63 to a flight director 64 of the type shown, for example, in U.S. Patent No. 2,613,352 entitled "Radio Navigation System" of Kellogg issued October 7, 1952. The relays 11, 17, 20, 40 and 51 are controlled by switch means 65 in accordance with the radio-defined altitude as a function of the position of the shaft 25. A vertical gyro 66 is connected to an input terminal of the elevator channel 12 to provide pitch displacement signals in a conventional manner.

In operation, referring to FIGS. 1 and 2, during the glide path capture mode of operation, the relay 11 is closed thereby connecting the radio receiver and coupler 10 to the elevator 12 in order that the aircraft is guided to fly along the flight path defined by the center line of the glide slope beam. At point A during glide path coupling, the relay 17 is closed placing the barometric computer 13 in a follow-up condition thus producing no output signal. The relays 40 and 51 are in their lowermost positions as shown in order that the flare computer servo loop 67 is rapidly following up on itself thereby providing a zero output signal from the amplifier 22. The relays 20 and 61 are closed but with the barometric computer 13 and the flare computer 67 in follow-up no signal from them appears at the elevator channel 12.

When the aircraft reaches about 150 feet above the runway, for example, at point B, the glide slope beam no longer provides adequate signals for the reasons explained above, and the glide path extension mode of operation is entered into. At point B, the radio altimeter 23 actuates the switch means 65 to open the relay 11 thereby disconnecting the radio receiver and coupler 10 from the elevator channel 12. Simultaneously, the radio altimeter 23 actuates the switch means 65 to open the relay 17, thereby providing a barometric rate of descent signal from the barometric computer 13 to the elevator channel 12. The barometric rate of descent signal also goes to the amplifier 22 and with the switches 40 and 51 in their lowermost condition, the flare computer servo loop 67 is in fast follow-up thereby nulling out any input signals. In a similar manner, the radio altimeter signal from the potentiometer 27 is connected through the amplifier 22 and is rapidly followed up in order that the wiper 32 follows the wiper 26.

As the aircraft continues along the flight path controlled primarily by the signal from the barometric computer 13, a point C is reached, for example, at 32 feet, at which the exponential flare mode of operation is entered into.

Since the pressure rate of descent is used for glide path extension and radar altitude is used to compute flare guidance, it is important to transfer control from the barometric computer 13 to the flare computer 67 without the introduction of large transient signals into the elevator channel 12. This object is accomplished by adding the output of the barometric computer 13 to the flare computer input summing amplifier 22 during the glide path extension mode of operation. This causes the flare computer 67 to drive to a new reference altitude. This new reference corresponds to the actual altitude plus or minus any standoff error in the barometric computer 13. When the flare mode is engaged, at point C, the barometric computer 13 is returned to a follow-up mode, the barometric computer output goes to a null and the standoff error is transferred to the flare computer 67 which shows up as a new reference altitude.

In this manner the path reference altitude of the flare computer 67 is synchronized to the actual path reference of the barometric computer 13 without any transients injected into the elevator channel 12. Thus, a smooth uninterrupted interchange of reference is accomplished. During the glide path extension mode of operation, it will also be noted that the flare computer servo 67 has been continuously and rapidly following up on both the barometric and radio signals in order that there is no abrupt transition from one mode of operation to another at points A and B, and particularly at point C.

At point C, the relay 17 is closed by the operation of the switch means 65 in order that the barometric computer 13 is again placed in a follow-up mode. By operation of the switch means 65, relay 20 is opened thereby disconnecting the barometric computer 13 from the elevator channel 12 and the switches 40 and 51 are placed in their uppermost positions thereby placing the flare computer servo 67 in a velocity servo configuration. The error signal between the height above the runway defined by the radio altimeter 23 in the bridge network 30 on the potentiometer 27 and the generated path signal appearing on the potentiometer 31 is used to command the pitch change necessary to guide the aircraft to a smooth touchdown. By summing the servo displacement from potentiometer 31 with the servo velocity from tachometer 45 in the amplifier 42, an exponential path guidance command signal is generated at the output of amplifier 22. The exponential path is obtained by forcing the velocity of the shaft 44 to become proportional to the input command which is equal to radar altitude at the time the flare mode is engaged. From this point on, the computer output shaft position is proportional to its own velocity, thereby generating an exponential path command which is a function of time and servo damping characteristics in accordance with the derivation given below.

In this way, a path command signal is generated which is a true exponential function with time and satisfies the following equation:

$$X + K\dot{x} = 0$$

where $x$ = servo shaft position
$\dot{x}$ = servo shaft velocity, and K = path time constant Let
$x = \theta_0 + \theta$ where $\theta_0$ = initial servo shaft position at the flare altitude
and
$\dot{x} = \dot{\theta}_0 + \dot{\theta}$ where $\dot{\theta}_0$ = initial servo shaft velocity at the flare altitude thus by substitution—

$$\theta_0 + \theta + K(\dot{\theta}_0 + \dot{\theta}) = 0$$

If "K" is adjusted so that:

$$\theta_0 = -K\dot{\theta}_0$$

then $$\theta_0 + K\dot{\theta}_0 = 0$$

This equation can be expressed as a function of time, where $$\theta = \theta_0 e^{-t/K}$$

For a linear potentiometer, the output signal is proportional to shaft position. Therefore, the equation for the commanded height is as follows:

$$h_c = h_f e^{-t/K}$$

Where:

$h_c$ = commanded height from the computer
$h_f$ = flare initiation height.

The error signal commanding a pitch change in the autopilot is the difference between commanded height ($h_c$) and altimeter output ($h$). Therefore, the pitch command may be expressed as:

$$\theta_c = k(h_c - h)$$

Where:

$k$ = gain constant in degrees of pitch per foot of altitude.

It can be seen from the above equation that the condition for $\theta_c = 0$ is that:

$$h = h_c$$

This equation identifies the actual flight path with the commanded path.

A standard linear potentiometer 31 is utilized in the bridge network 30 with the radio altimeter output potentiometer 27 to synchronize the flare computer 67 to the reference altitude during follow-up and provide a path reference source during the flare guidance mode. This feature enables the flare computer 67 to maintain the required relationship between displacement and rate at all times regardless of initial conditions or external disturbances. Since an exponential cannot attain zero in a finite time, a bias is provided to assure runway contact at a predetermined rate of descent. In FIG. 1, this has been designated "Image Runway Selector" and is shown as potentiometer 33. Typically, an image runway setting of 8 feet is expected to result in a final touchdown rate of 1.6 ft./sec. at runway contact, for example.

The relay 51 is used to switch the tachometer gain at the "flare point" in order to maintain a constant rate of descent during the transition from glide path extension to flare. The initial rate of descent, is preselected by adjustment of voltage divider resistors 46, 47 and 48. This adjustment is a function of flare height and the average rate of descent of a particular aircraft during an ILS approach.

The equation relating the generation of an exponential path reference as a function of circuit parameters is as follows:

$$h_c = (h_f + h_1)e^{-\alpha k_{\theta p} t}$$

where $h_c$ = altitude path reference (feet)
$h_f$ = flare height above actual runway (feet)
$h_1$ = actual runway height above image (feet)
$\alpha$ = servo gain (radian/sec.)
$k_{\theta p}$ = altitude follower potentiometer sensitivity (volts per radian)

The path equation can be expressed in terms of path time constant as follows:

$$h_c = (h_f + h_1)e^{-t/T}$$

Where $$T = \text{time constant} = \frac{1}{\alpha k_{\theta p}} \text{ (seconds)}$$

By servo loop analysis, it can be shown that $$\alpha = \frac{K_A K_V}{N\left(1 + \frac{K_A K_V K_g}{A}\right)}$$

where $K_A$ = servo amplifier gain
$K_V$ = servo motor gain
$N$ = gear train ratio
$K_g$ = tachometer gain
$A$ = initial rate gain (servo loop)

Therefore, the landing distance which is proportional to path time constant is controllable by any one of the parameters listed above.

The natural rate of an exponential is proportional to its displacement at all times. Differentiating the above equation with respect to time yields the following equation of path rate:

$$\dot{h}_c = -\frac{(h_f+h_i)}{T}e^{-t/T}$$

Thus we can relate the displacement and rate of an exponential path as:

$$\dot{h}_c + K h_c = 0$$

Where $$-K = T = \frac{1}{\alpha k_{\theta_D}} \text{ (seconds)}$$

The initial rate can be evaluated in terms of circuit parameters by letting $t=0$ $$\dot{h}_c|_{t=0} = \frac{-(h_f+h_i)}{T}$$

By substitution of previous expressions into above equation, initial rate can be expressed as follows:

$$\dot{h}_c|_{t=0} = -(h_f+h_i)\left[\frac{K_A K_v}{N\left(1+\frac{K_A K_v K_E}{A}\right)}\right]k_{\theta_D}$$

Thus, the initial rate is a function of tachometer gain and the height at which "flare" is initiated.

Combining the equations for $\theta_c$ and $h_c$ where $T=-K$ results in $$\theta_c = K[(h_f+h_i)e^{-t/T} - h]$$

This equation expresses the pitch commanded to keep the aircraft on an exponential path.

Typical system parameters for the present invention operating in a DC-3 are as follows:

$h_f = 32$ feet
$h_i = 8$ feet
$\dot{h}_c = 8$ ft./sec.
$T = 40/8 = 5$ seconds
$k = 0.14$ degrees/ft.
Touchdown rate of descent $= 1.6$ ft./sec.

Past performance has shown that fixed programmed path guidance during flare can be less than desirable. Disturbances to the aircraft at low elevations can cause violent maneuvers and sometimes put the craft in an unsafe attitude. It is much more desirable to accept the disturbance in path and provide a new reference which will guide the aircraft along a somewhat parallel but asymptotic path, thereby duplicating realistic pilot control without violent maneuvers. This type of control is attained by use of the variable limiter 55 in which the actual limit level is varied as a function of height above the runway through the use of the potentiometer 57 and where path softening is obtained as a function of error from the reference flight path. In effect, the variable limiter 55 causes the altitude-to-pitch sensitivity to vary as a function of height and error from the path. The dotted line shown during flare guidance as illustrated in FIG. 1 is an example of "slippery path control" resulting from vertical wind shear close to the ground.

In order to execute a flare maneuver, the flight path angle of the aircraft must be increased. This change in path angle is accompanied by a similar change in pitch attitude. Some form of pitch trim must be provided in order to balance the output of the gyro, or an error must be accepted in path. Pitch trim may be injected into the pitch axis at the time the flare mode is engaged in order to maintain the desired path by means of a pitch bias voltage in a conventional manner not shown for purposes of simplicity.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:
1. In apparatus for guiding an aircraft,
 (a) means responsive to a first condition of said aircraft for providing a first signal representative thereof,
 (b) means responsive to a second condition of said aircraft for providing a second signal representative thereof,
 (c) signal generating and comparison means having first and second signal generating portions for providing third and fourth signals respectively,
 (d) said first signal generating portion being responsive to said first aircraft condition signal,
 (e) first algebraic summation means responsive to said second, third and fourth signals for providing a first output signal representative of the algebraic summation thereof,
 (f) servo means including second algebraic summation means for providing a second output signal, said servo means including means for providing a feedback signal to said second algebraic summation means, said servo means being controlled in accordance with said second output signal for controlling said second signal generating means in accordance therewith, and
 (g) switch means for alternatively connecting said first algebraic summation means to said second algebraic summation means in a first mode of operation for placing said apparatus in a follow-up condition, and connecting said second signal generating means to said second algebrac summation means in a second mode of operation for providing an output signal from said first algebraic summation device representative of the difference between said third signal and the combination of said second and fourth signals thereby preventing transients when switching from one mode of operation to another.

2. In apparatus for guiding an aircraft to a landing,
 (a) means including radio altimeter means for providing a first signal representative of the radio-defined altitude of said aircraft,
 (b) means including barometeric altimeter means for providing a second signal representative of a function of the pressure altitude of said aircraft,
 (c) comparison means having first and second signal generating portions for providing third and fourth signals respectively,
 (d) said first signal generating portion being responsive to said first signal,
 (e) first algebraic summation means responsive to said second, third, and fourth signals for providing a first output signal representative of the algebraic summation thereof,
 (f) servo means including second algebraic summation means for providing an output signal, said servo means including means for providing a feedback signal to said second algebraic summation means, said servo means being controlled in accordance with said second output signal for controlling said second signal generating portion in accordance therewith, and
 (g) switch means for alternatively connecting said first algebraic summation means to said second algebraic summation means in a first mode of operation and said second signal generating portion to said second algebraic summation means in a second mode of operation for placing said apparatus in a follow-up condition and for providing an output signal from said first algebraic summation device representative of the difference between said third signal and the combination of said second and fourth signals thereby preventing transients when switching from one mode of operation to another.

3. Apparatus of the character recited in claim 2 further including variable limiting means responsive to the output from said first algebraic summation means for limiting said output thereof in excess of a predetermined value and means responsive to said first signal for varying the limit of said limiting means as a function of the altitude of said aircraft.

4. In apparatus for guiding an aircraft to a landing,
   (a) means including radio altimeter means for providing a first signal representative of the radio-defined altitude of said aircraft,
   (b) means including barometric altimeter means for providing a second signal representative of a function of the pressure altitude of said aircraft,
   (c) bridge network means having first and second adjustable potentiometers for providing third and fourth signals, respectively,
   (d) said first potentiometer being adapted to be positioned in accordance with said first signal,
   (e) first algebraic summation means responsive to said second, third, and fourth signals for providing a first output signal representative of the algebraic summation thereof,
   (f) servo means including second algebraic summation means for providing an output signal, said servo means including means for providing a feedback signal to said second algebraic summation means, said servo means being controlled in accordance with said second output signal for controlling said second potentiometer in accordance therewith, and
   (g) switch means for automatically connecting said second algebraic summation in a first mode of operation and said second potentiometer to said second algebraic summation means in a second mode of operation for placing said apparatus in a follow-up condition when in said first mode of operation, and for providing an output signal from said first algebraic summation device representative of the difference between said third and the combination of said second and fourth signals in said second mode of operation, thereby preventing transients when switching from one mode of operation to another.

5. Apparatus of the character recited in claim 4 further including variable limiting means responsive to the output from said first algebraic summation means for limiting said output thereof in excess of a predetermined value and means responsive to said first signal for varying the limit of said limiting means as a function of the radio-defined altitude of said aircraft.

6. Apparatus of the character recited in claim 4 in which the bridge network includes means for biasing said first potentiometer for providing a positive signal when otherwise the signal would be zero.

7. Apparatus of the character recited in claim 4 in which said means for providing a feedback signal is adjustable for maintaining the velocity of said servo means in said second mode of operation the same as that in said first mode of operation.

8. Apparatus of the character recited in claim 7 in which in said first mode of operation, said servo means is a position type servo system and in said second mode of operation said servo means is a velocity type servo system whereby the velocity servo action provides an exponential flare-out path.

9. Apparatus of the character recited in claim 8 further including signal utilization means responsive to the signal from said limiting means for controlling said aircraft about its pitch axis.

10. In apparatus for guiding an aircraft to a landing,
    (a) means for providing a signal representative of the instantaneous altitude of said aircraft above ground level,
    (b) variable limiting means responsive to the altitude signal for limiting the output thereof in excess of a predetermined value, and
    (c) biasing means responsive to said altitude signal for varying the bias on said limiting means to vary the limit thereof as a function of said altitude signal.

11. In apparatus for guiding an aircraft to a landing,
    (a) means including radio altimeter means for providing a first signal representative of the radio-defined altitude of said aircraft,
    (b) bridge network comparison means having first and and second potentiometer portions for providing second and third signals respectively,
    (c) said first potentiometer being adapted to be positioned in accordance with said first signal,
    (d) algebraic summation means responsive to said second and third signals for providing an output representative of the algebraic summation thereof,
    (e) servo means responsive to said third signal for positioning said second potentiometer means in accordance therewith,
    (f) variable limiting means responsive to the output from said first algebraic summation means for limiting the output thereof in excess of a predetermined value, and
    (g) means for varying the limit of said limiting means in accordance with said first signal.

References Cited in the file of this patent
UNITED STATES PATENTS

| | | |
|---|---|---|
| 2,709,053 | Pine | May 24, 1955 |
| 3,032,756 | Tull | May 1, 1962 |
| 3,059,880 | Buxton | Oct. 23, 1962 |